United States Patent [19]

Mader

[11] 3,989,207

[45] Nov. 2, 1976

[54] PARACHUTE WITH DELAYED OPENING

[75] Inventor: Heinz B. Mader, Braunschweig, Germany

[73] Assignee: Bruggemann & Brand KG, Wetter, Ruhr, Germany

[22] Filed: Dec. 17, 1974

[21] Appl. No.: 533,532

[52] U.S. Cl. .............................................. 244/152
[51] Int. Cl.² .................................... B64D 17/76
[58] Field of Search ............ 244/142, 145, 152, 146

[56] References Cited

UNITED STATES PATENTS

| 2,501,670 | 3/1950 | Fogal | 244/145 |
|---|---|---|---|
| 2,562,799 | 7/1951 | Kowalski | 244/145 |
| 3,013,753 | 12/1961 | Hughes et al. | 244/145 |
| 3,079,114 | 2/1963 | Sepp | 244/152 |
| 3,127,137 | 3/1964 | Downing | 244/145 |

FOREIGN PATENTS OR APPLICATIONS

| 807,459 | 6/1951 | Germany | 244/142 |
|---|---|---|---|

Primary Examiner—Trygve M. Blix
Assistant Examiner—Galen L. Barefoot

[57] ABSTRACT

The invention relates to a parachute having a circular canopy and rigging lines secured to the base of said canopy. A continuous strip of material is attached to said rigging lines below the canopy base whereby, during folding up of the canopy during packing of the parachute, a section of the strip between each pair of adjacent rigging lines can be folded in between each respective section of the canopy.

7 Claims, 5 Drawing Figures

PARACHUTE WITH DELAYED OPENING

The invention relates to a parachute having a circular canopy to the base of which the rigging lines are secured.

Parachutes of this type have symmetrically shaped circular canopies, and may include cut-away sections in the canopy for control purposes. In order to obtain the best possible force distribution during opening of the canopy one endeavours to let the opening process proceed symmetrically. However, the opening process is, on the other hand, influenced by different mutually influencing factors such as the weight of the load suspended from the parachute, the velocity of the load in relation to the surrounding air, and the method of packing the parachute.

It has hitherto been impossible to control sufficiently the influences of these factors, and as result opening has been asymmetrical and as a result of these irregular filling processes there is the constant danger that parts of the canopy at or near the base are pushed through the rigging lines below the base of the canopy. This causes the lines to roll across the canopy to be filled and finally divides the canopy into two unopened canopy sections. Apart from the fact that this causes damage to the canopy material, it also endangers the life of the parachutist as the parachute then tends to start rotating.

In order to increase the maximum permissible starting velocity or settling speed or to increase the load carried, at decreased speeds, means are incorporated in the parachutes to delay the opening process. A delay in opening results in a reduction of the speed during free falling relative to the onrushing air, thereby enabling the filling process to be effected slowly and more evenly so that the disadvantageous filling and opening thrust immediately following completion of the filling process and experienced particularly with personnel parachutes, is reduced. The purpose of the delay mechanism, therefore, is to prevent or delay the opening process for a specific period. A delay is achieved, for example, by using a circular canopy with a retracted base, i.e. when using circular canopies having a base whose diameter is drawn in so that it is smaller than the normal diameter. The base is drawn in by sewing onto the base so called pocket strips spaced at intervals by means of which an even fold formation is achieved which results in a canopy having a pronounced curve as opposed to the relatively flat curve of canopies without a retracted base.

It is the object of the invention to provide a parachute of the aforementioned type which opens symmetrically and evenly and dampens the filling and opening thrust even under varying operating conditions.

In accordance with the present invention such a parachute includes a continuous strip of material attached to the rigging lines below the canopy base, whereby, during folding up of the canopy during packing of the parachute, a section of the strip between each pair of adjacent rigging lines can be folded in between each respective section of the canopy.

A strip of this kind controls canopy filling during opening in such a way that the opening process proceeds symmetrically as well as with a certain amount of delay. The strips placed between the canopy sections cause a delay in the opening of the folds until the strips have slipped out of the folds and then, during opening, release the associated rigging lines and base parts for unfolding. During this time the whole system has become stretched so that prior to the start of the actual filling process there is established a symmetrically stretched structure of rigging lines and canopy parts.

The delay in opening of the canopy sections in the area of the base results in the upper area of the canopy initially filling more rapidly than the lower part so that the canopy goes through a pear-shaped transformation. Only gradually do the inserted sections of the strip slip out of the folded-over canopy sections and thus free the latter for complete opening.

In order for this to take place, during packing of the parachute, a strip is always positioned between each folded canopy section so that they are thus retained between the folded-over canopy sections as a result of friction between the material of the strips and the material of the canopy sections. For this it is of course necessary, as will be explained in detail later, that the strips are of the required dimensions and the material has a sufficient coefficient of friction relative the canopy material in order that the friction retention of the strips between the folded canopy strips is adequate.

As a result of this influence and the delay in filling, the speed of the parachute in relation to the onrushing air is simultaneously reduced thereby enabling the filling process to be effected more slowly and without interruption and thus permitting a symmetrical opening.

As is well known, the actual filling process is preceded by a stretching process of the parachute in which the rigging lines stretch in the same way as the unopened parachute from the base to the tip of the canopy. The air which now flows through the centre of the (still unopened) canopy cannot push apart the folded canopy sections in the area of the base because of the sandwiched strips there, and thus sets off the opening process in the upper part of the canopy, as already described.

The delay in the opening of the canopy sections as a result of the sandwiched strip sections reduces the filling and opening thrust which otherwise acts in a manner harmful to the parachutist or other load.

The continuous strip has the additional advantage in that the rigging lines are prevented from being pulled over the canopy since it is not possible in a parachute according to the invention for a part of the canopy to push through beneath the rigging line.

Preferably, the strip is spaced apart from the canopy base and has a width such that after folding together of the ends of each section of the strip, the length of the loop so formed is sufficient for it to be folded over the respective canopy section.

The insertion of a section of the strip between any two rigging lines appropriately takes place in a manner in which the strip section is folded once, whereby this double strip section only has half of the original total length and the ends of each strip section attached to the rigging lines are arranged on top of one another. Subsequently the loop thus formed is folded over in a transverse direction, namely in the direction towards the base, so that a large part of this strip loop covers the associated canopy section. Sufficient covering of the strip sections during the opening and filling process is the prerequisite for the necessary holding action and thus the delay. The coverage must naturally be adequate not only in the longitudinal direction of the strip, but also widthwise. As previously mentioned, a strip which is too wide cannot be folded over in the form of a loop in the direction of the canopy strips to give sufficient cover in the longitudinal direction. For this reason the width of the strip must always be chosen optimally in relation to the section length.

An advantageous embodiment of the parachute according to the invention has a strip whose width is approximately 100 mm at a section (length of strip between two rigging lines 3) of approximately 600 mm, a gap between the strip and the base of approximately 25 mm and a distance between the rigging lines measured at the base of about 760 mm. The difference in the length of the space between the rigging lines and the sections is caused by the feature of the retracted base, which is described later in the specification.

In order to obtain sufficient friction between the canopy and the strip material it is appropriate when using a synthetic canopy material, for example of nylon fabric, to use a strip made from textile fabric, such as for example cotton, with reinforced edges. This embodiment of the strip meets simultaneously the requirements regarding strength, economic production and weight. Between the friction coefficient of the chosen materials and the surface of the canopy material which is covered by the inserted strip loop it is possible to establish a relationship with regard to the particular friction and adhesive values which are necessary for the required delay in opening.

It is also possible to improve the delay effect by arranging the looped strip sections between each two folded canopy sections not separately, but several placed on top of one another.

An essential advantage of the invention consists in the fact that the continuous strip can be simultaneously used in a very simple manner to retract the base inwards, i.e. to reduce its diameter by forming a very steeply curved circular canopy. The advantage is achieved by the fact that the strip is shorter in length than the circumferential length of the base. In this way it is possible to achieve the generally known effect, namely that circular canopies with a retracted base open more slowly than flat circular canopies. The pocket strips hitherto used for this purpose become superfluous since this function is now taken over by the strip, simply as a result of a suitable measureing of the strip. In accordance with such a measurement in the aforementioned example the section length of the strip, namely the strip length between two rigging line, is approximately 600 mm at a corresponding base length or rigging line distance at that point of 760 mm.

One example of a parachute in accordance with the invention will now be described with reference to the accompanying drawings, of which:

Figure 1:
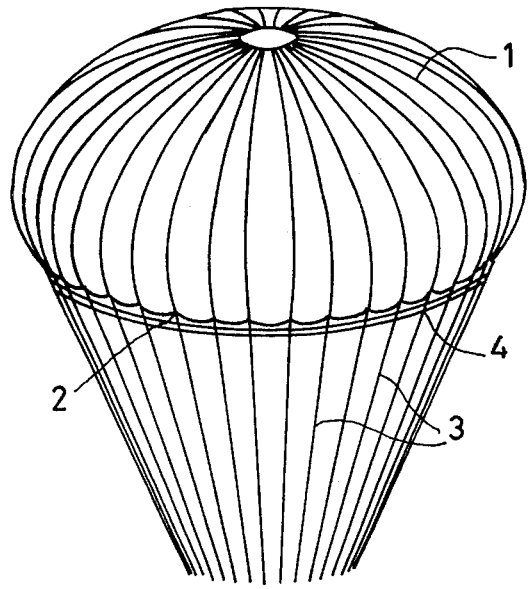
FIG. 1 is a perspective view of the canopy of the parachute, when opened.

As shown in FIG. 1 the parachute has a circular canopy 1 to the base 2 of which rigging lines 3 are attached. Directly below the base 2 at a short distance from it there is attached an endless strip 4. The length of the strip is less than the circumferential length of the base so that the latter is retracted inwards in the opened condition, resulting in the shape, shown in FIG. 1, of the steeply curved circular canopy.

Figure 2:
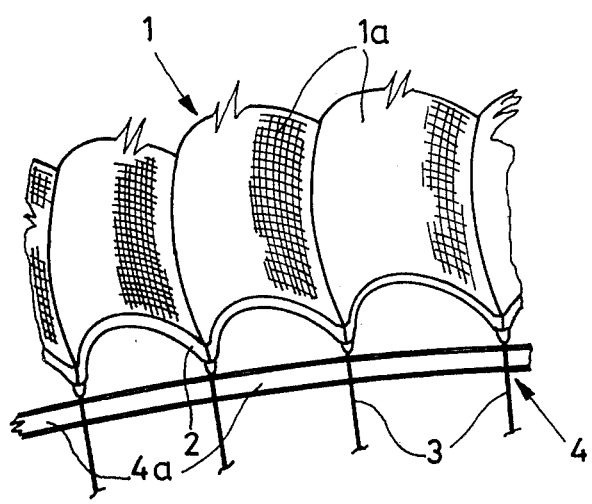
FIG. 2 is an enlarged perspective view of a part of the base of the canopy with the rigging lines attached.

FIG. 2 shows how the stretched and taut strip sections 4 form cross-sectionally arch-shaped canopy sections 1. These conditions can be achieved for example with a length of each strip section (i.e. the length between adjacent rigging lines 3) of approximately 600 mm at a corresponding base length of 760mm.

Figure 3:
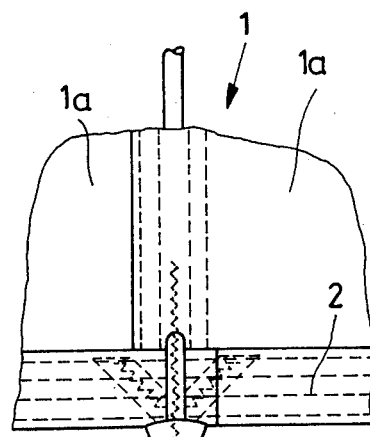
FIG. 3 is a further enlarged schematic side view of a part of the parachute.

FIG. 3 shows in detail, the strip 4, made from a textile fabric, and having reinforced edges 5. The textile fabric may for example be a cotton fabric when the canopy material is a fabric made from sythetic fibres. The choice of material however is dependent on there being the required friction, for the required retaining and delaying effect of the strip 4, between the strip material and the canopy material.

FIG. 3 also shows the strip 4 located a short distance below the base 2. This distance in this example is 25 mm when the strip width is 100 mm and the length of the individual strip sections is as already mentioned 600 mm. The criteria governing the dimensions of the strip and its individual sections have already been discussed at the beginning.

Figure 4:
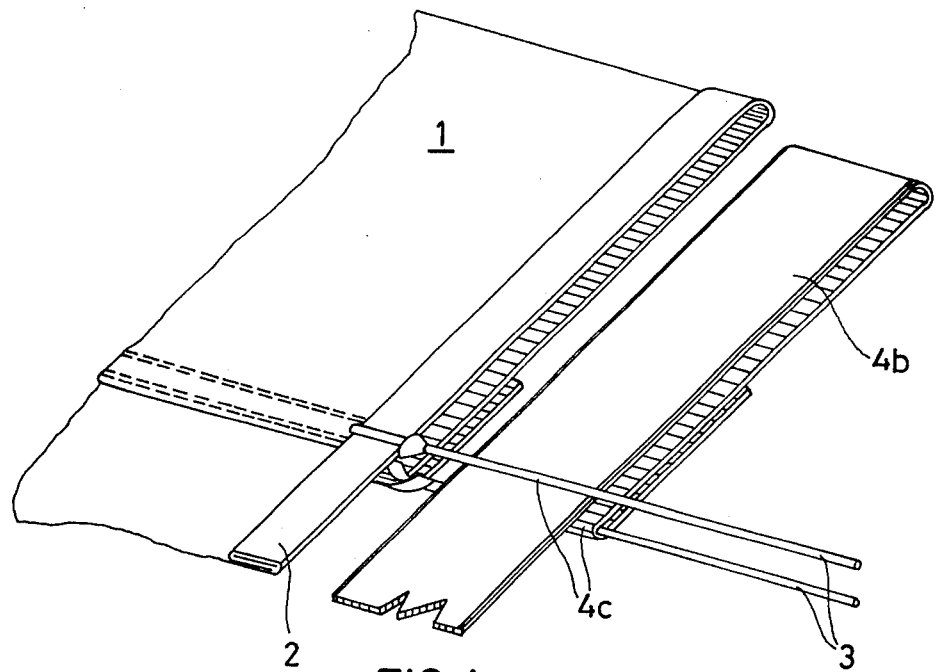
FIGS. 4 and 5 are perspective and schematic views showing the way a section of the strip flanked by two rigging lines is folded and turned over during packing of the parachute.
Figure 5:
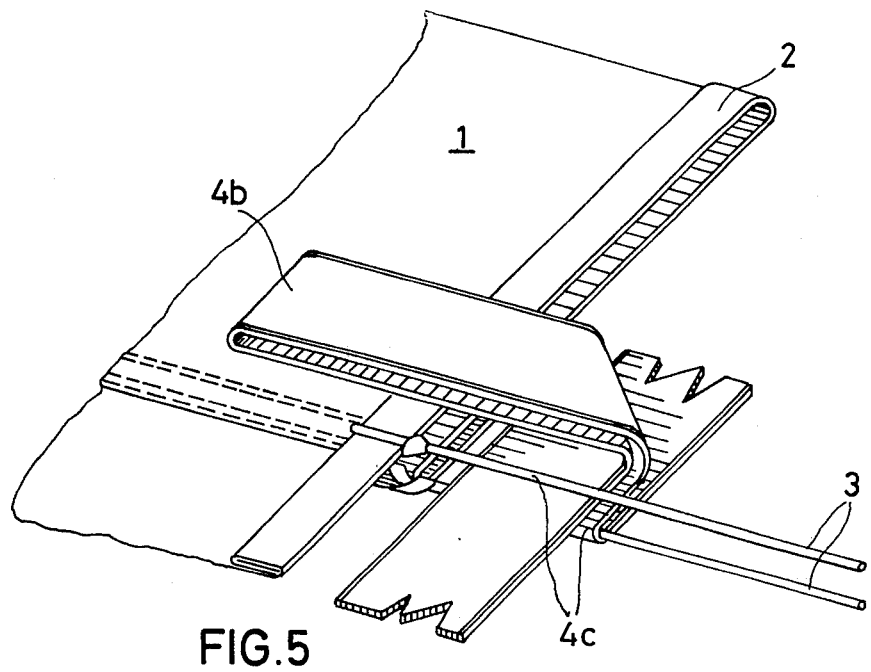

FIGS. 4 and 5 show how, during packing of the parachute, a strip section 4a is initially folded into a loop 4b (see FIG. 4) in such a way that its ends 4c (at adjacent rigging lines 3) rest on top of one another. The ends of each strip section 4c are, as can be seen from FIG. 3 firmly attached to the rigging lines 3 at the end of each strip section 4a. Secondly, the strip loop 4b (as shown in FIG. 5) is folded over transversely to the strip 4 in the direction of the canopy sections, these loop parts being arranged between the folded canopy strips, whereby during the filling and opening process of the parachute, for safeguarding against premature opening of the canopy, in the area of the base, the loops 4b are retained between the folds of the canopy sections 1a for a short time. The width of the strip must not be too great as a sufficient loop length has to be maintained which can be arranged between the folds of the canopy sections. On the other hand the width of the strip must also not be too narrow as otherwise the friction surface facing the strip will be too small.

Any further explanation of the folding processes during packing of the parachute is superfluous as these are well known to those skilled in the art. The steps during opening and filling of the canopy and the function of the strip 4 and its individual sections 4a, loops 4b respectively, have already been clearly described at the beginning and do not need to be repeated here.

I claim:

1. A parachute comprising:
    a substantially circular canopy terminating in a base portion, at least said base portion of said canopy being formed of a first fabric,
    a plurality of rigging lines secured to said base portion and extending outwardly therefrom,
    a substantially continuous strip of material attached to said rigging lines below said canopy and spaced from said base portion a first distance, adjacent of said rigging lines being attached to said strip at intervals of a second distance, said strip being of a particular width measured parallel to said rigging lines and being formed of a second fabric having a coefficient of friction greater than the coefficient of friction of said first fabric, said first distance, said second distance and said width being dimensionally so related as to allow, when a pair of adjacent of said rigging lines are substantially superimposed upon each other so that the base portion of said canopy and the portion of said strip therebetween are each folded over upon themselves, the said folded over portion of said strip can be placed radially inwardly of said base portion in superimposed relationship to said base portion with the area of said strip superimposed upon said base portion sufficient to establish a frictional interrelationship with said base portion when said parachute is packed of such magnitude as to delay the opening of said folded over base portion of said canopy.

2. A parachute according to claim 1, in which the circumference of said strip is less than the circumference of said base portion, whereby the base portion of the opened canopy is retracted radially inwardly.

3. A parachute according to claim 1, wherein said first distance is approximately 25 millimeters, said second distance is approximately 600 millimeters, the width of said strip is approximately 100 millimeters, and the distance between points on said canopy base portion to which adjacent pairs of said rigging lines are attached is approximately 760 millimeters.

4. A parachute according to claim 1 wherein said second distance is approximately 24 times greater than said first distance, the width of said strip is approximately four times greater than said first distance, and the distance between points of attachment of adjacent pairs of said rigging lines to said canopy at said base portion is approximately 30 times greater than said first distance.

5. A parachute according to claim 1 wherein said first fabric is a synthetic fabric and said second fabric is a textile fiber.

6. A parachute according to claim 1 wherein said second fabric is cotton.

7. A method for folding a parachute having a substantially circular canopy terminating in a base portion, a plurality of rigging lines secured to said base portion and extending outwardly therefrom, and a substantially continuous strip of material attached to said rigging lines below said base portion and spaced therefrom, comprising the steps of:
  substantially superimposing one rigging line upon an adjacent one of said rigging lines so that the portion of said strip disposed between said rigging lines is folded over upon itself to form a loop extending substantially perpendicular to said rigging lines,
  folding said loop transversely toward said canopy so that a portion of said loop is superimposed upon said base portion, and
  folding said base portion over upon itself so that said portion of said loop is integral between folds of said base portion of said canopy,
  whereby when said canopy is opened in use the frictional engagement between said portion of said loop and said base portion inhibits the opening of said base portion of said canopy.

* * * * *